(No Model.)
W. JANISZEWSKI.
VEHICLE HUB.
No. 476,018. Patented May 31, 1892.
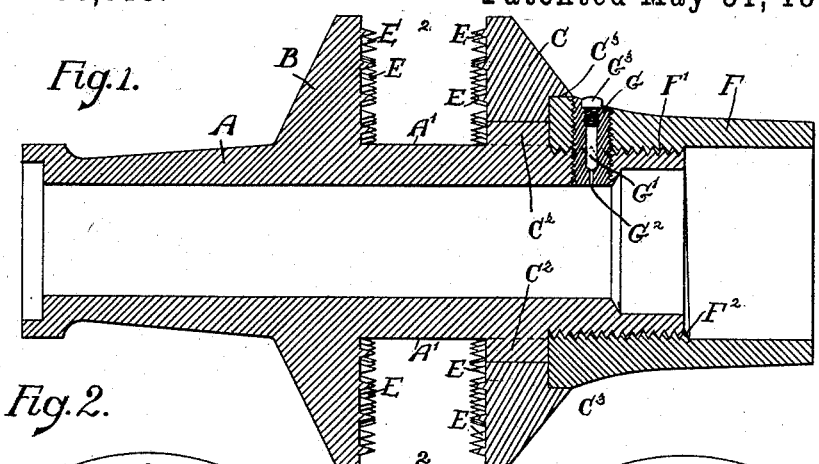
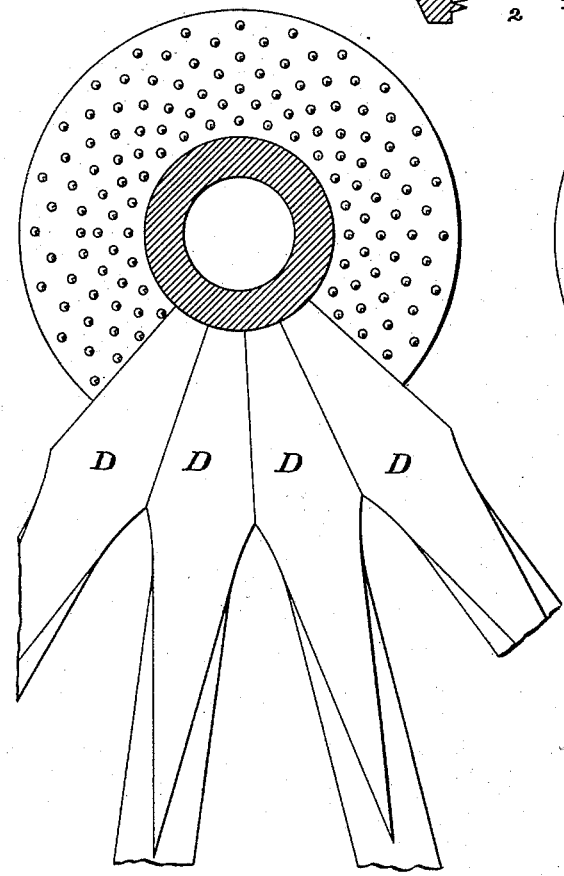
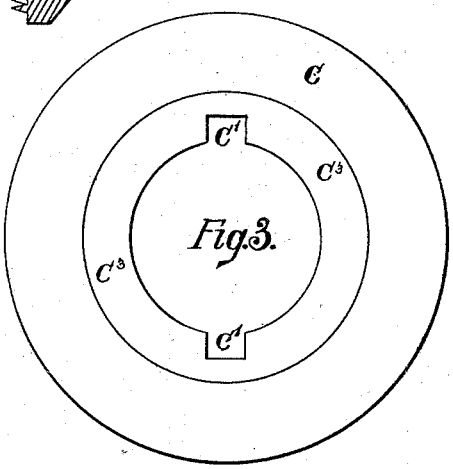
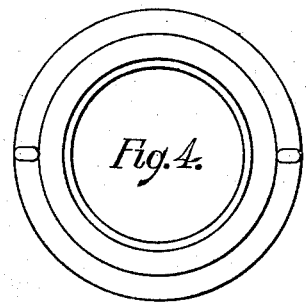
Attest:
Henry Appleton
K. Smith
Inventor:
Wladyslaw Janiszewski
per Wm. Hubbell Fisher,
Atty

UNITED STATES PATENT OFFICE.

WLADYSLAW JANISZEWSKI, OF CINCINNATI, OHIO.

VEHICLE-HUB.

SPECIFICATION forming part of Letters Patent No. 476,018, dated May 31, 1892.

Application filed October 6, 1891. Serial No. 407,872. (No model.)

*To all whom it may concern:*

Be it known that I, WLADYSLAW JANISZEWSKI, a citizen of the United States, and a resident of the city of Cincinnati, in the county of Hamilton and State of Ohio, have invented certain new and useful Improvements in Hubs for the Wheels of Road-Vehicles, of which the following is a specification.

The several features of my invention and the various advantages resulting from their use conjointly or otherwise will be apparent from the following description and claims.

In the accompanying drawings, making a part of this specification, and to which reference is made, Figure 1 is a vertical longitudinal central section of a hub embodying my invention. Fig. 2 is a vertical central cross-section taken in the plane of the dotted lines 2 2 of Fig. 1. That side of the section is shown which faces toward the right hand in Fig. 1. In said Fig. 2 the inner end portions of four of the spokes are shown in elevation in the position which they occupy relative to one another when located in the hub. Fig. 3 is a view of the movable ring forming a part of the hub. This view is an end elevation of that side of the ring which is at the right hand in Fig. 1. Fig. 4 is an end elevation of the nut shown in Fig. 1 and looking at that end of the nut which is at the right hand in Fig. 1.

Upon and around a metallic hub A of suitable shape is located a ring or annular flange B. The preferred mode of uniting the said ring to the said hub is by casting the ring and the hub in one piece, thereby making the two parts integral. The hub is likewise provided with a second annular flange C, located upon the hub in such a manner that it shall face the first-named annular flange B, and that between them there shall be left an annular space around the hub of sufficient size to receive the spokes which are to be combined and used with said hub.

In order to obtain the highest advantages for my invention, it is desirable that the annular flange C be rendered non-rotatable upon the hub. The preferred means for attaining this end consists in providing the annular flange C with a groove or grooves C', connected with an interior space located within said annular flange. Where there are two of the said grooves at opposite sides of the said space, as shown in Fig. 3, the opposition to the rotation of the said flange is more symmetrical. The hub A is provided with the projections or lugs $C^2$ $C^2$, one of which projections enters one of the channels C' and the other of said projections enters the other channel C', substantially as shown in Fig. 1. Inasmuch as the spokes D are made of wood or other substance easily penetrated by pins or sharp-pointed projections, the spokes are inserted between the annular flanges B and C. Their inner ends preferably rest against that portion A' of the hub which lies between the annular flanges, substantially as shown in Figs. 1 and 2. Either or both of these annular flanges are provided with pins or pointed projections E. After the spokes have been placed between the said flanges the movable annular flange C is advanced toward the annular flange B and compels the points E to enter the adjacent ends of the spokes D. The preferred means for holding the movable flange in place after being advanced consists of the nut F, provided with the interior screw-thread F', engaging a screw-thread $F^2$, formed upon the exterior of the right-hand end of the hub. When this nut is screwed up against the outer side of the flange C, the latter is held in a fixed position.

For the purpose of improving the appearance of the wheel and imparting to it a better finish the exterior or rear side of the flange C is provided with an annular recess $C^3$. The forward end of the nut in being screwed up enters the said annular recess $C^3$, substantially as shown in Fig. 1. A suitable set-screw may be employed to hold the nut F stationary after being screwed into place upon the hub. Such a set-screw is shown in Fig. 1, and is indicated by the letter G, the set-screw being screwed through the nut F and into the hub A, substantially as shown. In order to more fully utilize this set-screw, I combine therewith a lubricator, as follows: The set-screw is provided with a large axial chamber G', which continues from the outer end of the set-screw to a short distance from its inner end. This axial chamber G' is then greatly diminished in size, and is continued in this reduced form $G^2$ to the end of the set-screw. The axial chamber G' is filled with a suitable lubricant for the axle, and the upper end thereof is closed by a suitable stopple, preferably such as $G^3$, secured in position by the screw-thread or otherwise. The lubricant passes down through the opening $G^2$ to the axle, and the axle in its rotation distributes the lubricant over its surface and the opposing adjacent surface of the hub.

In order to obtain the highest benefit for my invention, the opposing faces of each of the flanges B and C are to be provided with the projecting points E. In this way both sides of each spoke are held securely in place without the aid of bolts or flanges introduceed between the spokes.

In certain cases where the spokes are subject to very little strain, as in children's carriages and vehicles for very light work, the presence of the pointed pins or projections on either one of these flanges would be sufficient. Of course, so far as my invention is concerned, it is immaterial whether the annular movable flange be located at the right or left hand end of the hub of Fig. 1.

What I claim as new and of my invention, and desire to secure by Letters Patent, is—

1. The metallic hub provided with the annular flange B, and a movable flange and an adjustable flange C, and spokes located between the said flanges and held in position by sharp-pointed projections located on one of the said flanges, the hub being provided with the projection $C^2$ and the annular flange being provided with recess C', receiving said projection $C^2$, substantially as and for the purposes specified.

2. The metallic hub provided with the annular flange B and a movable flange and an adjustable flange C, and spokes located between the said flanges and held in position by sharp-pointed projections located on one of the said flanges, the hub being provided with the projection $C^2$ and the annular flange being provided with recess C', receiving said projection $C^2$, and the nut F, screwed upon the hub for preventing the recession of the flange C, substantially as and for the purposes specified.

3. The metallic hub provided with the annular flange B and a movable flange and an adjustable flange C, and spokes located between the said flanges and held in position by sharp-pointed projections located on one of the said flanges, the hub being provided with the projection $C^2$ and the annular flange being provided with recess C', receiving said projection $C^2$, and the nut F, screwed upon the hub for preventing the recession of the flange C, the annular flange C being provided with the annular recess $C^3$, into which the nut F is received when screwed forward, substantially as and for the purposes specified.

4. The metallic hub provided with the annular flange B and a movable flange and an adjustable flange C, and spokes located between the said flanges and held in position by sharp-pointed projections located on one of the said flanges, and the nut F, screwed upon the hub for preventing the recession of the flange C, and the set-screw G, having chamber G' and opening $G^2$ and stopple $G^3$, substantially as and for the purposes specified.

5. A metallic hub provided with an annular flange B and a movable flange and an adjustable flange C, and spokes located between the said flanges and held in position by sharp-pointed projections located on the opposing faces of both of the said flanges, the flange C being provided with the annular recess $C^3$ and the nut F, the screw being received into the said recess when advanced upon the hub into place, substantially as and for the purposes specified.

6. A metallic hub provided with an annular flange B and a movable flange and an adjustable flange C, and spokes located between the said flanges and held in position by sharp-pointed projections located on the opposing faces of both of the said flanges, the annular flange being provided with the recess C' and the hub being provided with the projection $C^2$, entering the said recess C', the flange C being further provided with the annular recess $C^3$ and the nut F, the screw being received into the said recess when advanced upon the hub into place, substantially as and for the purposes specified.

WLADYSLAW JANISZEWSKI.

Attest:
F. W. BROWNE,
K. SMITH.